US011231855B2

(12) United States Patent
Gupta et al.

(10) Patent No.: US 11,231,855 B2
(45) Date of Patent: Jan. 25, 2022

(54) DETERMINATION OF A TYPE OF DESTAGE TO PERFORM BASED ON PREFERENCE BETWEEN PERFORMANCE OF OPERATIONS AND PRESERVATION OF DRIVE LIFE USING A MACHINE LEARNING MODULE

(71) Applicant: INTERNATIONAL BUSINESS MACHINES CORPORATION, Armonk, NY (US)

(72) Inventors: Lokesh Mohan Gupta, Tucson, AZ (US); Clint A. Hardy, Tucson, AZ (US); Karl Allen Nielsen, Tucson, AZ (US); Brian Anthony Rinaldi, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/848,411

(22) Filed: Apr. 14, 2020

(65) Prior Publication Data
US 2021/0318807 A1 Oct. 14, 2021

(51) Int. Cl.
G06F 3/06 (2006.01)
G06N 3/04 (2006.01)
G06F 11/10 (2006.01)

(52) U.S. Cl.
CPC ............ *G06F 3/0616* (2013.01); *G06F 3/064* (2013.01); *G06F 3/0611* (2013.01); *G06F 3/0689* (2013.01); *G06F 11/1076* (2013.01); *G06N 3/04* (2013.01)

(58) Field of Classification Search
CPC ...... G06F 3/0616; G06F 3/0611; G06F 3/064; G06F 11/1076; G06F 3/0689; G06N 3/04
See application file for complete search history.

(56) References Cited

U.S. PATENT DOCUMENTS

| 7,958,310 | B2 | 6/2011 | Benhase et al. |
| 9,395,925 | B2 | 7/2016 | Ash et al. |
| 9,524,244 | B2 | 12/2016 | Boden et al. |
| 2008/0168220 | A1 | 7/2008 | Gill et al. |
| 2009/0157974 | A1* | 6/2009 | Lasser ............. G06F 12/0893 711/135 |

(Continued)

OTHER PUBLICATIONS

List of IBM Patents or Patent Applications Treated as Related, pp. 2, dated Jan. 14, 2020.

(Continued)

*Primary Examiner* — David Yi
*Assistant Examiner* — Dustin B. Fulford
(74) *Attorney, Agent, or Firm* — Konrad Raynes Davda & Victor LLP; Rabindranath Dutta

(57) ABSTRACT

A storage controller is configured to perform a full stride destage, a strip destage, and an individual track destage. A machine learning module receives a plurality of inputs corresponding to a plurality of factors that affect performance of data transfer operations and preservation of drive life in the storage controller. In response to receiving the inputs, the machine learning module generates a first output, a second output, and a third output that indicate a preference measure for the full stride destage, the strip destage, and the individual track destage respectively.

20 Claims, 16 Drawing Sheets

(56) References Cited

U.S. PATENT DOCUMENTS

| | | |
|---|---|---|
| 2010/0174867 A1 | 7/2010 | Gill et al. |
| 2014/0365725 A1 | 12/2014 | Barrell et al. |
| 2015/0134914 A1* | 5/2015 | Ash .................. G06F 12/123 |
| | | 711/136 |
| 2015/0261453 A1 | 9/2015 | Ash et al. |
| 2016/0321190 A1 | 11/2016 | Ash et al. |
| 2017/0054824 A1 | 2/2017 | Friedman et al. |
| 2019/0260204 A1* | 8/2019 | Koval .................. G06N 3/126 |
| 2019/0317898 A1 | 10/2019 | Gupta et al. |
| 2019/0332471 A1 | 10/2019 | Gupta et al. |

OTHER PUBLICATIONS

U.S. Appl. No. 16/848,403, filed Apr. 14, 2020.
Office Action dated May 28, 2021, pp. 27, for U.S. Appl. No. 16/848,403.
PCT International Search Report and Written Opinion dated Jun. 28, 2021, pp. 9, for Serial No. PCT CN2021/083008.
Response dated Aug. 30, 2021, pp. 10, to Office Action dated May 28, 2021, pp. 27, for U.S. Appl. No. 16/848,403.
Notice of Allowance dated Nov. 5, 2021, p. 21, for U.S. Appl. No. 16/848,403.

* cited by examiner

800

Max bandwidth vs. current bandwidth

If current bandwidth > Max bandwidth then
Expected output for FullStrideScore = 0
Expected output for StripScore = 0
Expected output for IndividualTrackScore = 1

Else

FullStrideScore = (MaxBandwidth - Current Bandwidth) / MaxBandwidth
StripScore = (MaxBandwidth - Current Bandwidth) / (MaxBandwidth X 2)
IndividualTrackScore = 1 - ((MaxBandwidth - Current Bandwidth) / MaxBandwidth)

FIG. 8

┌─ 900
Max IOPS vs current IOPS

If current IOPS > Max IOPS then
Expected output for FullStrideScore = 1
Expected output for StripScore = 1
Expected Output for IndividualTrackScore = 0

Else

FullStrideScore = 1- (MaxIOPS - Current IOPS) / MaxIOPS
StripScore = (1- (MaxIOPS - Current IOPS) / MaxIOPS) / 2
IndividualTrackScore = (MaxIOPS - Current IOPS) / MaxIOPS

FIG. 9

```
┌─ 1000
│ Optimal writes vs. drive writes
│
│ If drive writes are greater than optimal writes then
│ Expected output for FullStrideScore = 0
│ Expected output for StripScore = 0
│ Expected Output for IndividualTrackScore = 1
│
│ Else
│
│ FullStrideScore = (OptimalWrites - Actual Writes) / OptimalWrites
│ StripScore = (OptimalWrites - Actual Writes) / (OptimalWrites X 2)
│ IndividualTrackScore = 1 - (OptimalWrites - Actual Writes) / OptimalWrites
```

Parity Lock Contention vs Optimal Parity Lock contention

If Parity Lock Contention is above optimal parity lock contention
Expected output for FullStrideScore = 1
Expected output for StripScore = 0
Expected Output for IndividualTrackScore = 0

Else

FullStrideScore = 1-
((OptimalParitylockContention - ActualParitylockContention) /
OptimalParitylockContention)

StripScore =
((OptimalParitylockContention - ActualParitylockContention) /
OptimalParitylockContention)

IndividualTrackScore =
((OptimalParitylockContention- ActualParitylockContention) /
OptimalParitylockContention)

Difference in expected output and actual output is changed based on performance and drive life weight to train the neural network.

Difference to train neural network =

(Expected Score - Actual Score) X Performance Weight / Drive Life Weight

FIG. 12

DETERMINATION OF A TYPE OF DESTAGE TO PERFORM BASED ON PREFERENCE BETWEEN PERFORMANCE OF OPERATIONS AND PRESERVATION OF DRIVE LIFE USING A MACHINE LEARNING MODULE

BACKGROUND

1. Field

Embodiments relate to the determination of a type of destage to perform based on preference between performance of operations and preservation of drive life using a machine learning module.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual-server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device.

In computer data storage, data striping is the technique of segmenting logically sequential data, such as a file, so that consecutive segments are stored on different physical storage devices such as disks. The segments of sequential data written to or read from a disk before the operation continues on the next disk are usually called chunks, strides or stripe units, while their logical groups forming single striped operations are called strips or stripes.

Striping is used across disk drives in Redundant array of Independent disks (RAID) storage. RAID is a data storage virtualization technology that combines multiple physical disk drive components into one or more logical units for the purposes of data redundancy and performance improvement. Data is distributed across the drives in one of several ways, referred to as RAID levels, depending on the required level of redundancy and performance. The different schemes, or data distribution layouts, are named by the word "RAID" followed by a number, for example RAID 0 or RAID 1. Each scheme, or RAID level, provides a different balance among the key goals of reliability, availability, performance, and capacity. RAID levels greater than RAID 0 provide protection against unrecoverable sector read errors, as well as against failures of whole physical drives via parity information that is maintained for stored data. A strip is a term that is related to a single disk, and is a predefined number of contiguous addressable blocks in that disk. A stripe comes in action in case of a RAID set, and it is the set of strips spanning across all the drives in that RAID set.

Artificial neural networks (also referred to as neural networks) are computing systems that may have been inspired by the biological neural networks that constitute animal brains. Neural networks may be configured to use a feedback mechanism to learn to perform certain computational tasks. Neural networks are a type of machine learning mechanism.

SUMMARY OF THE PREFERRED EMBODIMENTS

Provided are a method, system, and computer program product in which a storage controller is configured to perform a full stride destage, a strip destage, and an individual track destage. A machine learning module receives a plurality of inputs corresponding to a plurality of factors that affect performance of data transfer operations and preservation of drive life in the storage controller. In response to receiving the inputs, the machine learning module generates a first output, a second output, and a third output that indicate a preference measure for the full stride destage, the strip destage, and the individual track destage respectively.

In further embodiments a determination of which type of destage to perform based on the first output, the second output, and the third output.

In additional embodiments, the plurality of factors includes input/output (I/O) operations and bandwidth on a rank, non-volatile storage (NVS) capacity, parity lock contention, holes, and unmodified data in a stride.

In yet additional embodiments, the plurality of factors also includes a wear level of a drive, writes per day classification of the drive, and an amount of modified data in the stride.

In further embodiments, computing of a margin of error to adjust weights in the machine learning module includes comparing a maximum bandwidth to a current bandwidth, comparing a maximum I/O operations per second (IOPS) to a current IOPS, comparing an optimal drive write measure to a measure of actual writes, and comparing a measure of optimal parity lock contention to a parity lock contention.

In additional embodiments, computing the margin of error to adjust the weights in the machine learning module further includes weighting adjustments to train the machine learning module based on a first weightage provided for the performance of data transfer operations and a second weightage provided for the preservation of drive life.

In further embodiments, the machine learning module is a neural network with one or more hidden layers, and wherein forward and backward propagation mechanisms are utilized to adjust weights in the neural network.

BRIEF DESCRIPTION OF THE DRAWINGS

Referring now to the drawings in which like reference numbers represent corresponding parts throughout:

FIG. 8 illustrates a block diagram that adjustments made in machine learning module based on bandwidth, in accordance with certain embodiments;

FIG. 9 illustrates a block diagram that shows adjustments made in a machine learning module based on I/O operations per second (IOPS), in accordance with certain embodiments;

FIG. 10 illustrates a block diagram that shows adjustments made in a machine learning module based on drive writes, in accordance with certain embodiments;

FIG. 11 illustrates a block diagram that shows adjustments made in a machine learning module based on parity lock contention, in accordance with certain embodiments;

FIG. 12 illustrates a block diagram that shows adjusting of weights for training the machine learning module based on weights provided by a user for performance and drive life, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

In certain embodiments, a storage controller may perform full stride destages or destages that are not full stride destages (e.g., strip destage or individual track destage) based on various factors that affect performance of destages and drive life. In a full stride destage all of the data and the parity in all of the strides (or stripes) are written during destage. In a strip destage, one or more strips are written during destage. In a track destage, one or more tracks are written during destage.

While performing destages, a number of factors may affect the performance of destages and the drive life, where the performance refers to how fast destages are completed, and the drive life refers to the life expectancy or endurance of the drives. Such factors that affect performance of the destages and the drive life include:

1. Non-volatile storage (NVS) full or not;
2. Amount of modified data in the stride;
3. Parity lock contention;
4. I/O is sequential or not;
5. Data sequentially written on disk or not;
6. Unmodified data already present in the stride or needs to be staged;
7. Bandwidth usage on the rank;
8. Number of I/O operations per second (IOPS) currently on the rank;
9. Number of holes in the stride;
10. Flash Wear Level;
11. Write Per Day classification of the drive;
12. Number of IOPS with full stride destage vs strip destage vs individual track destage; and
13. Response time for stages/destages on the rank.

A customer may prefer to strike a balance between the drive life and the performance of the destage operations. In certain embodiments, a storage controller determines whether to perform full stride destages or not perform full stride destages (e.g., strip destage or individual track destage) based on factors that affect performance and based on factors that affect the drive life.

Some of the factors influence drive endurance (i.e., life of the drives) whereas others affect performance. Certain customers may prefer performance over drive life whereas others may prefer drive life over performance. Certain embodiments compute separate scores for performance and drive life based on a plurality of factors and enable configuration settings to decide which scores to favor for a particular customer.

As a result of the large number of factors that can influence the decision to choose among full stride destages, strip destages, and individual track destages, certain embodiments train a machine learning module (e.g., a neural network) to make the choice among full stride destages, strip destages and individual track destages. As a result, improvements are made in the operations of a storage controller.

Exemplary Embodiments

Figure 1:
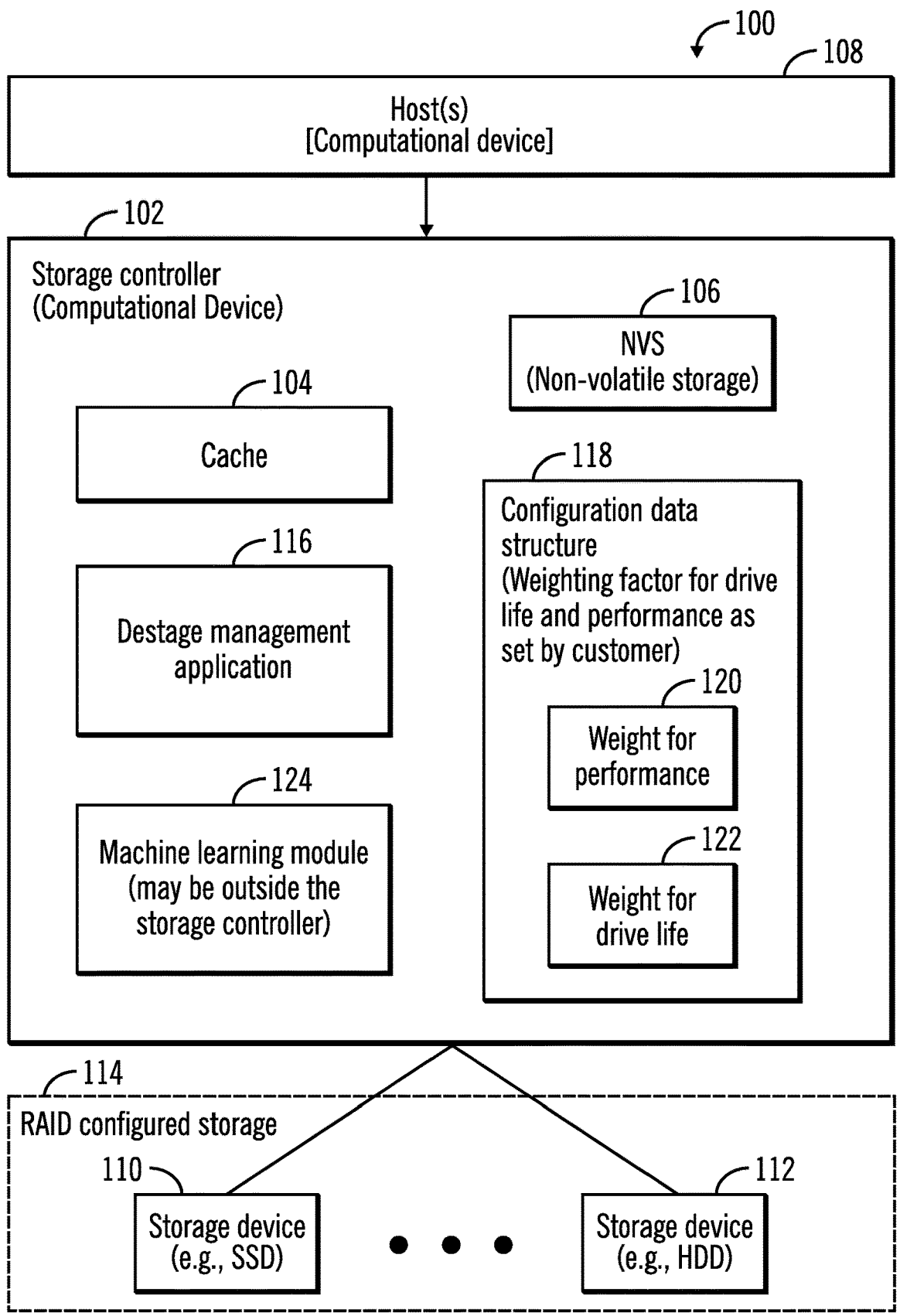
FIG. 1 illustrates a block diagram of a computing environment comprising a storage controller coupled to one or more hosts and one or more storage devices, in accordance with certain embodiments.

FIG. 1 illustrates a block diagram of a computing environment 100 comprising a storage controller 102 with a cache 104 and a non-volatile storage (NVS) 106, coupled to one or more hosts 108 and one or more storage devices 110, 112, in accordance with certain embodiments. The one or more storage devices 110, 112 may form a RAID configured storage 114.

The storage controller 102 allows the one or more hosts 108 to perform input/output (I/O) operations with logical storage maintained by the storage controller 102. The physical storage corresponding to the logical storage may be found in one or more of the storage devices 110, 112 and/or cache 104 and/or non-volatile storage (NVS) 106 of the storage controller 102.

The storage controller 102 and the hosts 108 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 108 may be elements in any suitable network, such as, a storage area network, a wide area network, the Internet, an intranet. In certain embodiments, storage controller 102 and the one or more hosts 108 may be elements in a cloud computing environment.

The cache 104 and the non-volatile storage 106 may be any suitable memory known in the art or developed in the future. The cache 104 and the non-volatile storage 106 may be distributed among two servers in a dual-server configuration of the storage controller 102. A destage management application 116 that is implemented in software, hardware, firmware or any combination thereof in the storage controller 102 may control destage operations from the storage controller 102 to secondary storage comprising the storage devices 110, 112.

The plurality of storage devices 110, 112 may be comprised of any storage devices known in the art. For example, the storage device 110 may be a solid state drive (SSD) and the storage device 112 may be a hard disk drive (HDD).

A configuration data structure 118 that provides a weight for performance of I/O operations (as shown via reference numeral 120) and a weight for drive life (as shown via reference numeral 122) may be maintained by the storage controller 102, where the weights are populated by the a customer or administrator or user to indicate whether to prioritize drive life over the performance of I/O operations or whether to prioritize performance of I/O operations over drive life. It should writes lower the drive life of a drive (particularly in the case of flash drives such as solid state drives).

In certain embodiments a machine learning module 124 may be implemented in software, hardware, firmware of any combination thereof inside or outside the storage controller 102. In certain embodiments, the machine learning module 124 is a neural network.

Figure 2:
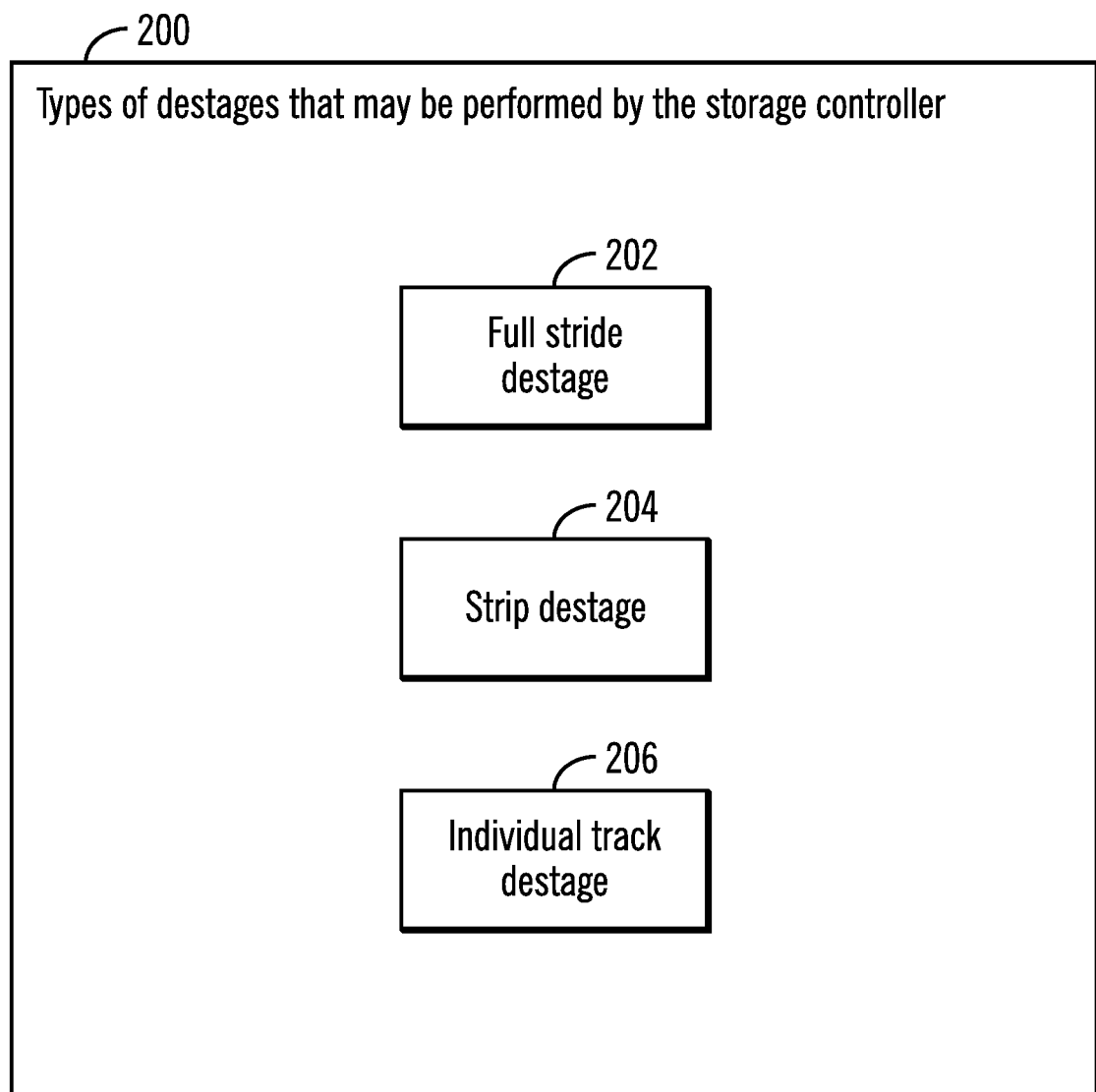
FIG. 2 illustrates a block diagram that shows the types of destages that may be performed by the storage controller, in accordance with certain embodiments.

FIG. 2 illustrates a block diagram 200 that shows the types of destages that may be performed by the storage controller 102 that has stored data in a RAID configuration, in accordance with certain embodiments. The types of destages include a full stride destage 202, a strip destage 204, and individual track destage 206.

In full stride destage 202 all strides are destaged. In strip destage 204 selected strips are destaged. In individual track destage 206, selected tracks are destaged. It should be noted that a strip is comprised of a plurality of tracks.

Figure 3:
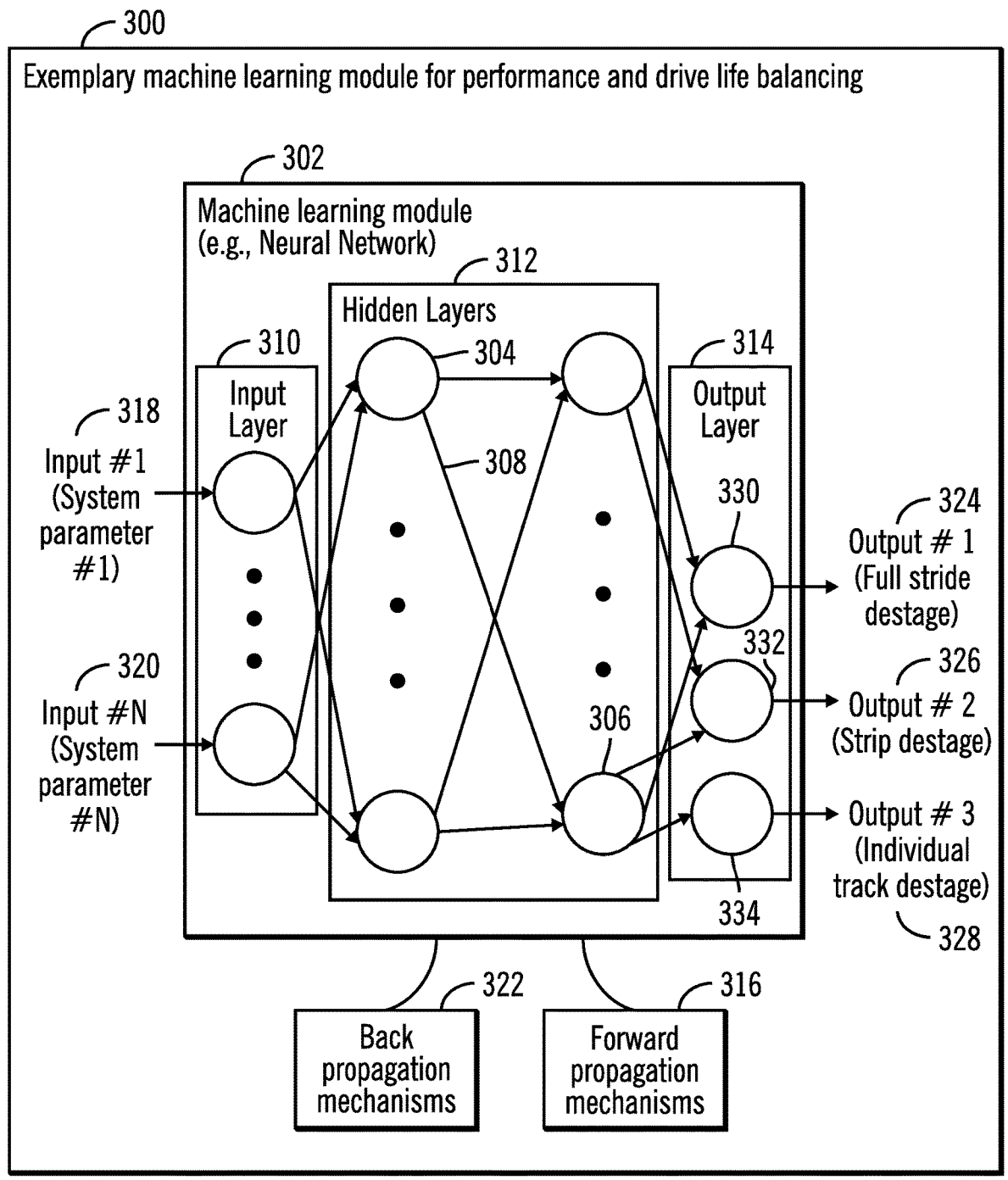
FIG. 3 illustrates a block diagram that shows a multi-output machine learning module for balancing performance with preservation of drive life, in accordance with certain embodiments.

FIG. 3 illustrates a block diagram 300 that shows a machine learning module 302 (corresponds to machine learning module 124 shown in FIG. 1) for determination of the proper destaging mechanism to balance performance and drive life, in accordance with certain embodiments. The block diagram 300 shows that the machine learning module 124 comprises a multi-output neural network 302.

The neural network 302 may comprise a collection of nodes with links connecting them, where the links are referred to as connections. For example, FIG. 3 shows a node 304 connected by a connection 308 to the node 306. The collection of nodes may be organized into three main parts: an input layer 310, one or more hidden layers, 312 and an output layer 314.

The connection between one node and another is represented by a number called a weight, where the weight may be either positive (if one node excites another) or negative (if one node suppresses or inhibits another). Training the neural network 302 entails calibrating the weights in the neural network 302 via mechanisms referred to as forward propagation 316 and back propagation 322. Bias nodes that are not connected to any previous layer may also be maintained in the neural network 302. A bias is an extra input of 1 with a weight attached to it for a node.

In forward propagation 316, a set of weights are applied to the input data 318, 320 to calculate outputs 324, 326, and 328. For the first forward propagation, the set of weights are selected randomly. In back propagation 322 a measurement is made the margin of error of the outputs 324, 326, 328 and the weights are adjusted to decrease the error. Back propagation 322 compares the outputs that the neural network 302 produces with the output that the neural network 302 was meant to produce, and uses the difference between them to modify the weights of the connections between the nodes of the neural network 302, starting from the output layer 314 through the hidden layers 312 to the input layer 310, i.e., going backward in the neural network 302. In time, back propagation 322 causes the neural network 302 to learn, reducing the difference between actual and intended outputs. Thus, the neural network 302 is configured to repeat both forward and back propagation until the weights (and potentially the biases) of the neural network 302 are calibrated to accurately predict an output.

In certain embodiments, the machine learning module 302 may be implemented in software, firmware, hardware or any combination thereof. For example, in one embodiment the machine learning module 302 may be implemented only in software, whereas in another embodiment the machine learning module 302 may be implemented in a combination of software, firmware, and hardware. In one embodiment, each node of the machine learning module 302 may be a lightweight hardware processor (e.g., a 1-bit processor) and there may be hardwired connections among the lightweight hardware processors. Software and/or firmware may implement the adjustment of weights of the links via adjustments in signals propagated via the hardwired connections.

In certain embodiments, the plurality of inputs 318, 320 comprise a plurality of system parameters of the computing environment 100 that correspond to factors that affect performance and drive life. The outputs 324, 326, 328 may provide indications of a measure of suitability of full stride destage, strip destage, and individual track destage respectively.

In certain embodiments, the machine learning module 302 is trained to improve the determination of the proper destage mechanism for the storage controller to balance performance with drive life. The training continuously improves the predictive ability of the machine learning module 302 over time.

Figure 4:
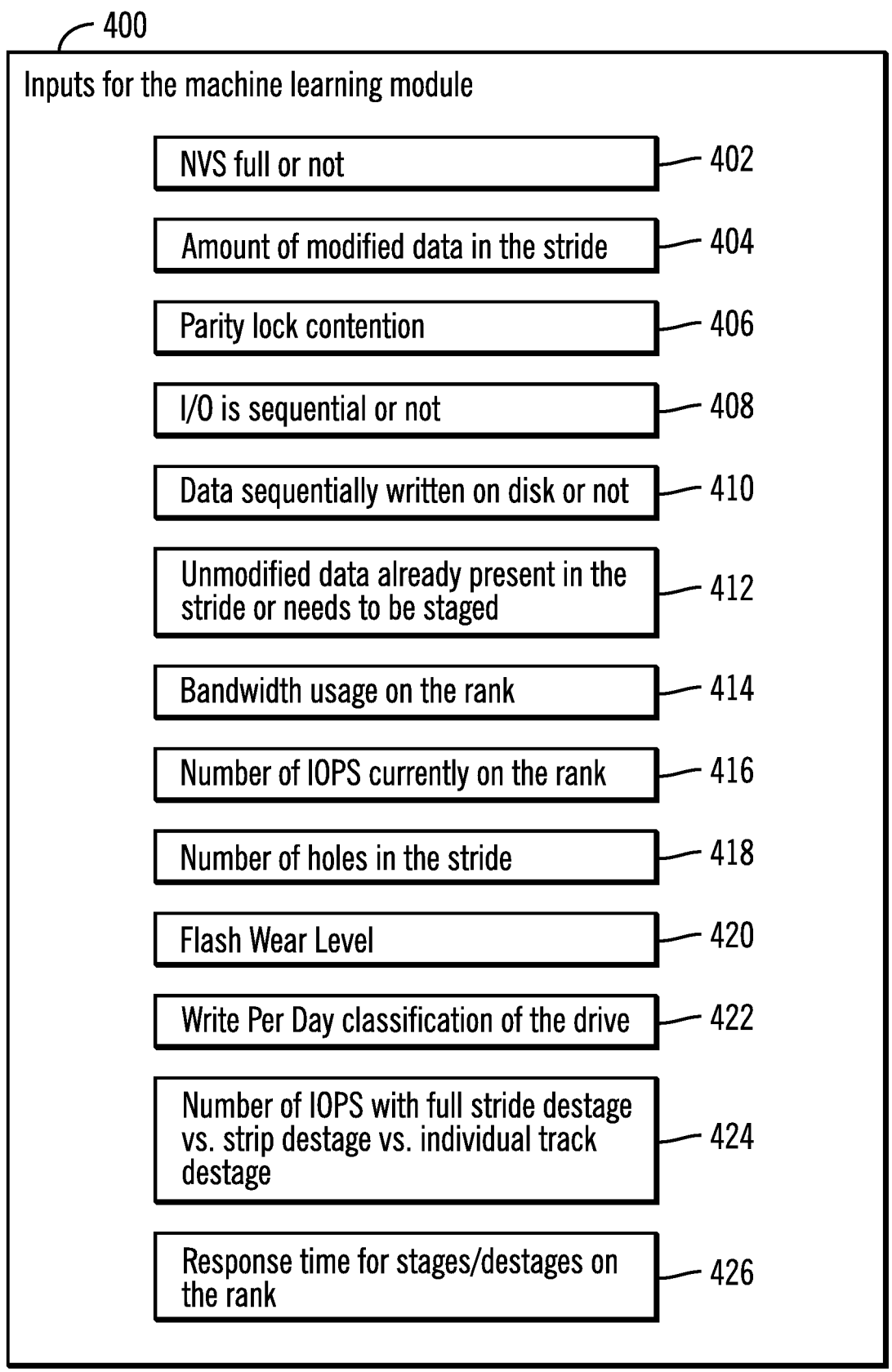
FIG. 4 illustrates a block diagram that shows inputs for the machine learning module, in accordance with certain embodiments.

FIG. 4 illustrates a block diagram 400 that shows inputs for the machine learning module 302. The inputs for the machine learning module 302 include the following:
1. NVS full or not (reference numeral 402);
2. Amount of modified data in the stride (reference numeral 404);
3. Parity lock contention (reference numeral 406);
4. I/O is sequential or not (reference numeral 408);
5. Data sequentially written on disk or not (reference numeral 410);
6. Unmodified data already present in the stride or needs to be staged (reference numeral 412);
7. Bandwidth usage on the rank (reference numeral 414);
8. Number of IOPS currently on the rank (reference numeral 416);
9. Number of holes in the stride (reference numeral 418).
10. Flash Wear Level (reference numeral 420);
11. Write Per Day classification of the drive (reference numeral 422);
12. Number of IOPS with full stride destage vs strip destage vs individual track destage (reference numeral 424); and
13. Response time for stages/destages on the rank (reference numeral 426).

Each of the performance factors may directly or indirectly affects the performance of disk I/O during destage operations. In alternative embodiments other factors or additional factors may be included in the inputs for the machine learning module 302.

Figure 5:
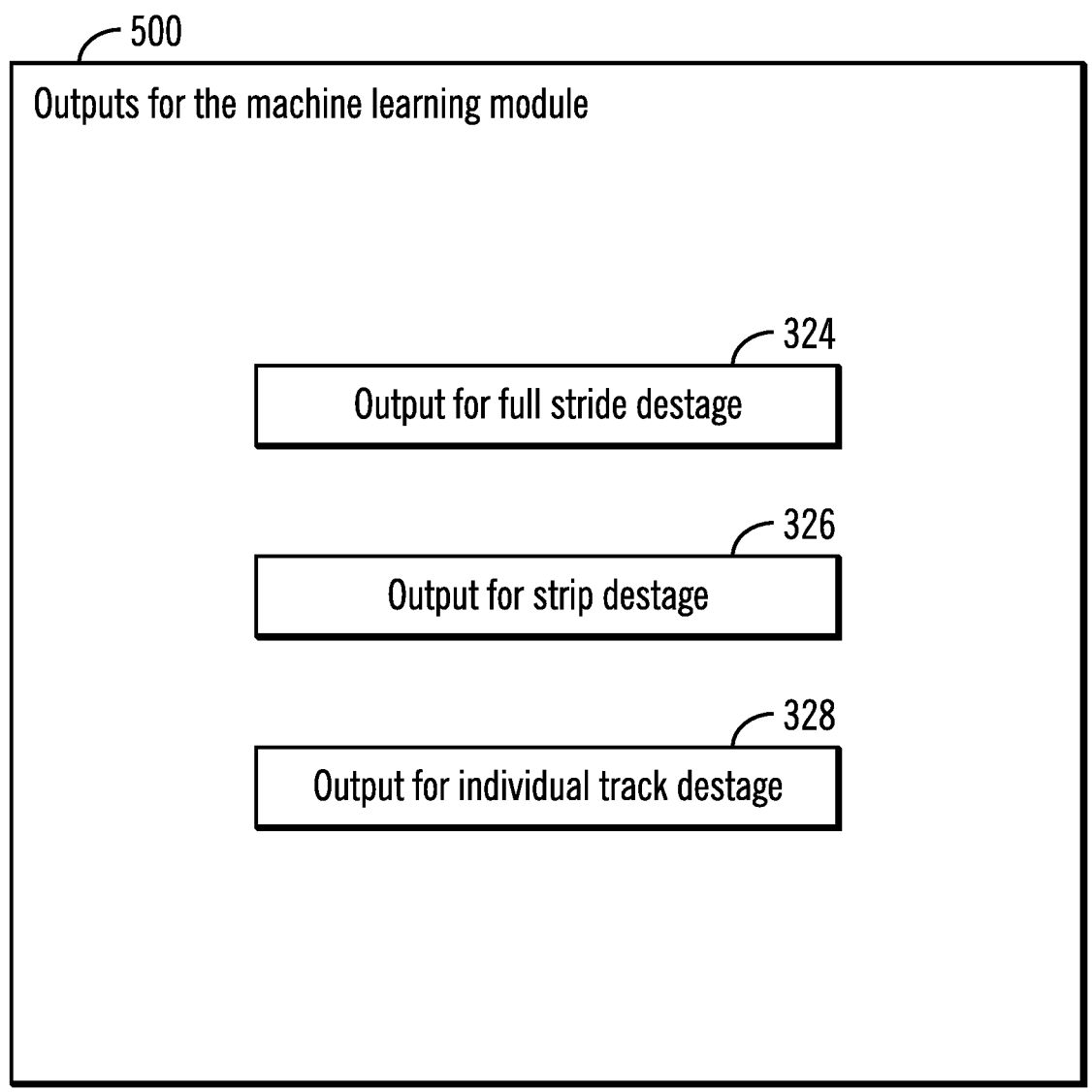
FIG. 5 illustrates a block diagram that shows outputs for the machine learning module.

FIG. 5 illustrates a block diagram 500 that shows outputs for the machine learning module 302.

The outputs of the machine learning module 302 include an output for full stride destage (reference number 324), an output for strip destage (reference numeral 326) and an output for individual track destage (reference numeral 328). The outputs may range from 0 to 1, and the output that is highest indicates the mechanism to use for destage. For example, the machine learning module 302 may indicate that the output for full stride destage is 0.7, the output for strip destage is 0.5, and the output for individual track destage is 0.1, and in such embodiments, the full stride destage mechanism is used.

Figure 6:
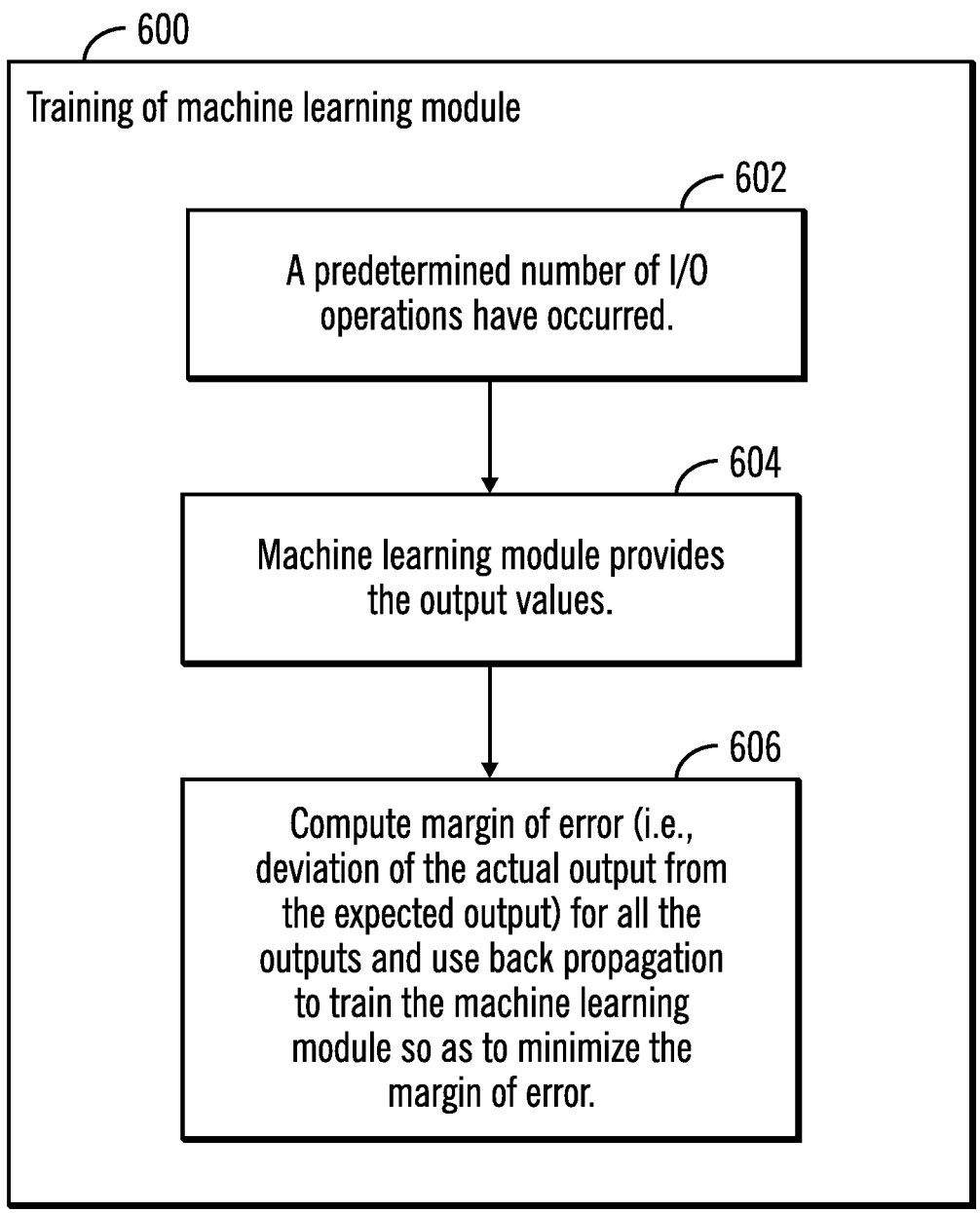
FIG. 6 illustrates a block diagram that shows training of the machine learning module.

FIG. 6 illustrates a block diagram that shows training of the machine learning module 302.

Control starts at block 602 in which a predetermined number of I/O operations have occurred. The machine learning module 302 provides (at block 604) via forward propagation, the output values 324, 326, 328. The margin of error is computed and back propagation is used (at block 608) to train the machine learning module 302. The margin of error is the deviation of the actual output from the expected output of the machine learning module 302, and the machine learning module 1302s attempts to reduce the error while adjusting the weights and biases.

When the machine learning module 302 is used in forward propagation, inputs and outputs are saved (for example save 100 inputs and outputs in the last interval). Then expected outputs are computed. The learning module 302 may be trained by sing the difference between expected outputs and actual outputs.

Figure 7:
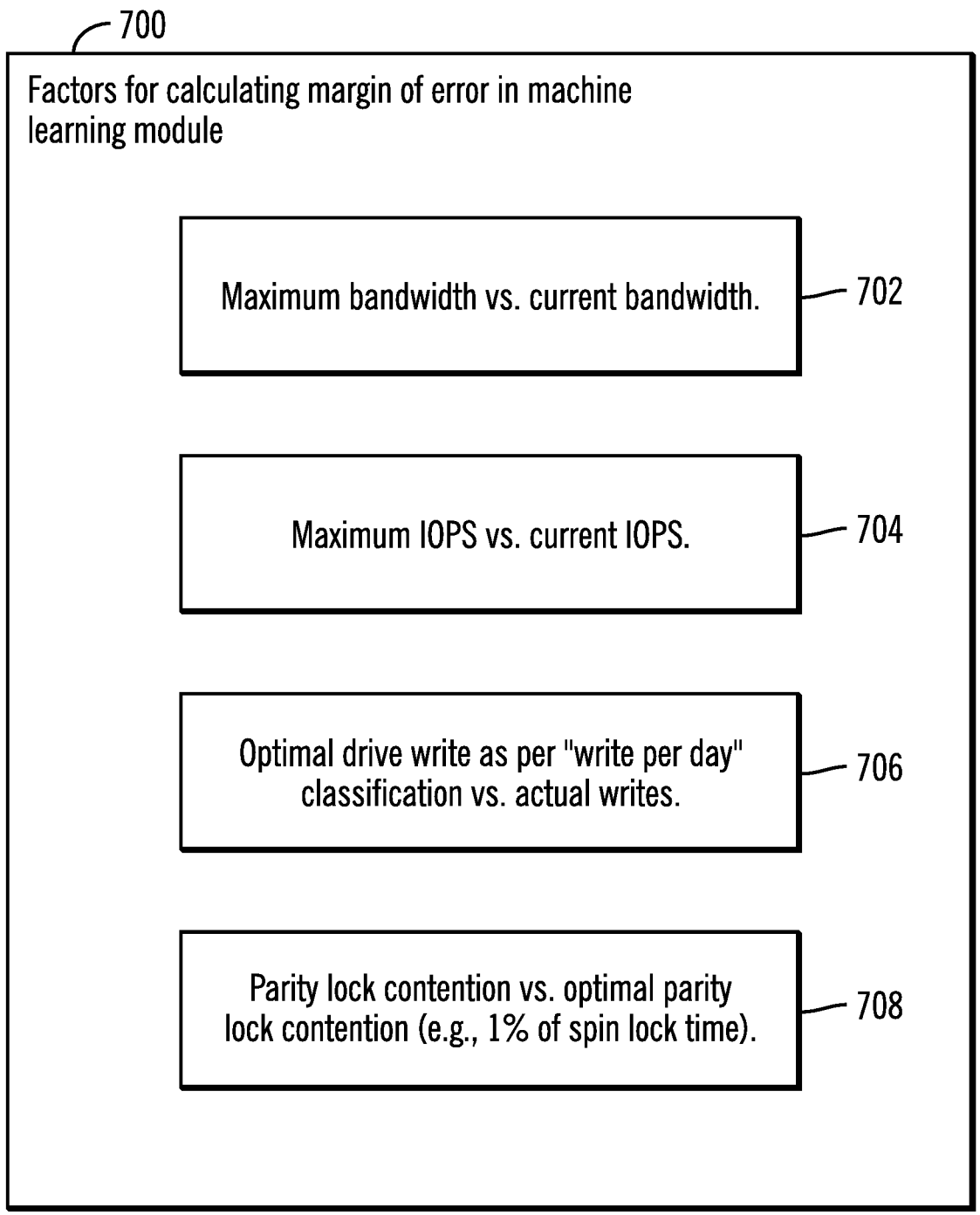
FIG. 7 illustrates a block diagram that shows factors for calculating margin of error in the machine learning module, in accordance with certain embodiments.

FIG. 7 illustrates a block diagram 700 that shows factors for calculating margin of error in the machine learning module 302, in accordance with certain embodiments.

The computing of a margin of error to adjust weights in the machine learning module includes comparing a maximum bandwidth to a current bandwidth (block 702), comparing a maximum I/O operations per second (IOPS) to a current IOPS (block 704), comparing an optimal drive write measure to a measure of actual writes (block 706), and comparing a measure of optimal parity lock contention to a parity lock contention (block 708). The optimal drive write may be in accordance with the "write per day classification" and the optimal parity lock contention may be 1% or some other percentage of a spin lock time.

FIGS. 8-11 provides details for operations shown in blocks 702, 704, 706, 708 of FIG. 7. The operations are shown in pseudocode and self-explanatory. It should be noted that alternative embodiments may perform the margin of error computations in a different way, and the ones shown in FIGS. 8-11 are examples. In the pseudocode "Max" is an abbreviation for maximum.

FIG. 8 illustrates a block diagram 800 that shows adjustments made in a machine learning module based on bandwidth, in accordance with certain embodiments. The psuedo-code is as follows:
If current bandwidth>Max bandwidth then
Expected output for FullStrideScore=0
Expected output for StripScore=0
Expected output for IndividualTrackScore=1
Else
FullStrideScore=(MaxBandwidth−Current Bandwidth)/MaxBandwidth
StripScore=(MaxBandwidth−Current Bandwidth)/(MaxBandwidth×2)
IndividualTrackScore=1−((MaxBandwidth−Current Bandwidth)/MaxBandwidth)

FIG. 9 illustrates a block diagram 900 that shows adjustments made in a machine learning module based on I/O operations per second (IOPS), in accordance with certain embodiments. The psuedo-code is as follows:
If current IOPS>Max IOPS then
Expected output for FullStrideScore=1
Expected output for StripScore=1
Expected Output for IndividualTrackScore=0
Else
FullStrideScore=1−(MaxIOPS−Current IOPS)/MaxIOPS
StripScore=(1−(MaxIOPS−Current IOPS)/MaxIOPS)/2
IndividualTrackScore=(MaxIOPS−Current IOPS)/MaxIOPS FIG. 10 illustrates a block diagram 1000 that shows adjustments made in a machine learning module based on drive writes, in accordance with certain embodiments. A comparison is made of number of drive writes in the last interval and the optimal drives a per drive classification. The psuedo-code is as follows:
If drive writes are greater than optimal writes then
Expected output for FullStrideScore=0
Expected output for StripScore=0
Expected Output for IndividualTrackScore=1
Else
FullStrideScore=(OptimalWrites−Actual Writes)/OptimalWrites
StripScore=(OptimalWrites−Actual Writes)/(OptimalWrites×2)
IndividualTrackScore=1−(OptimalWrites−Actual Writes)/OptimalWrites FIG. 11 illustrates a block diagram 1100 that shows adjustments made in machine learning module based on parity lock contention, in accordance with certain embodiments. The psuedo-code is as follows:
If Parity Lock Contention is above optimal parity lock contention
Expected output for FullStrideScore=1
Expected output for StripScore=0
Expected Output for IndividualTrackScore=0

Else
FullStrideScore=1−((OptimalParitylockContention−ActualParitylockContention)/OptimalParitylockContention)
StripScore=((OptimalParitylockContention−ActualParitylockContention)/OptimalParitylockContention)
IndividualTrackScore=((OptimalParitylockContention−ActualParitylockContention)/OptimalParitylockContention)

FIG. 12 illustrates a block diagram 1200 that adjusts weights for training the machine learning module based on weights provided by a user of performance and drive life, in accordance with certain embodiments.

The difference in expected output and actual output is changed based on performance weight to train the learning module in the pseudo-code shown in FIG. 7-11 as follows: Difference to train learning module=(Expected Score−Actual Score)*Performance Weight/Drive Life Weight.

Thus in certain embodiments, computing the margin of error to adjust the weights in the machine learning module 302 includes weighting adjustments to train the machine learning module based on a first weightage provided for the performance of data transfer operations and a second weightage provided for the preservation of drive life. These weightages may be provided by a user as shown in FIG. 1 reference numerals 120, 122.

Figure 13:
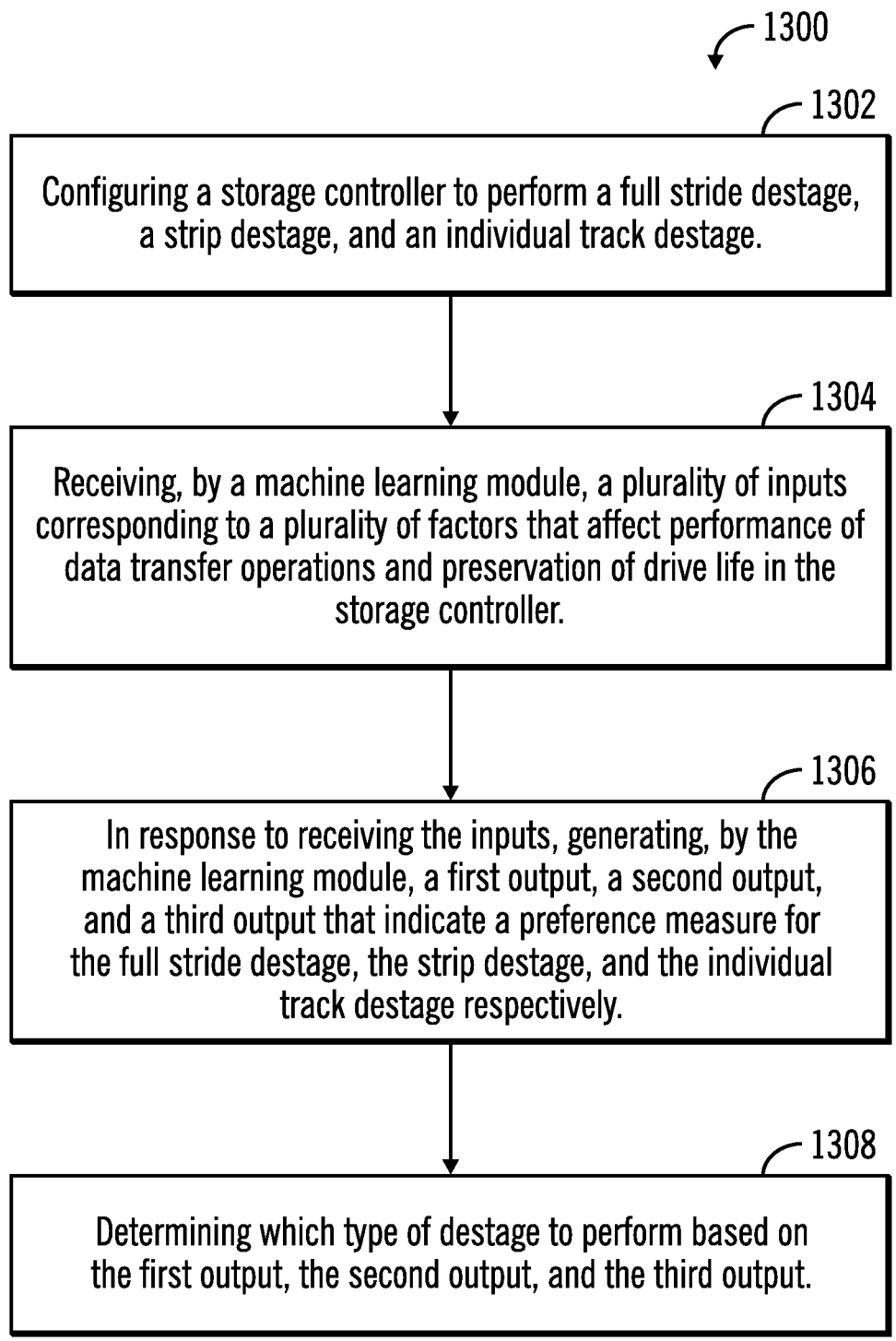
FIG. 13 illustrates a flowchart for selecting a type of destage to perform by the machine learning module, in accordance with certain embodiments.

FIG. 13 illustrates a flowchart 1300 for selecting a type of destage to perform by the machine learning module, in accordance with certain embodiments. The operations shown in FIG. 13 may be performed in the storage controller 102.

Control starts at block 1302, in which a storage controller 102 is configured to perform a full stride destage, a strip destage, and an individual track destage. A machine learning module 124 (also shown via reference numeral 302) receives (at block 1304) a plurality of inputs 318, 320 corresponding to a plurality of factors (shown in FIG. 4) that affect performance of data transfer operations and preservation of drive life in the storage controller 102.

From block 1304 control proceeds to block 1306 in which in response to receiving the inputs, the machine learning module 124 generates a first output 324, a second output 326, and a third output 328 that indicate a preference measure for the full stride destage, the strip destage, and the individual track destage respectively. A determination (at block 1308) of which type of destage to perform is based on the first output, the second output, and the third output.

Therefore, FIGS. 1-13 illustrate certain embodiments that use a learning mechanism to determine the type of destage to perform to adhere to weights for performance and weights for drive life provided in a configuration data structure.

While the embodiments described in FIGS. 1-13 show certain adjustments made or values assigned to the variables FullStrideScore, the StripScore, and the IndividualTrackScore, in alternative embodiments other adjustments or values may be used. There are other parameters in the embodiments to which certain representative values have been assigned, and these parameters may differ in alternative embodiments.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 14:
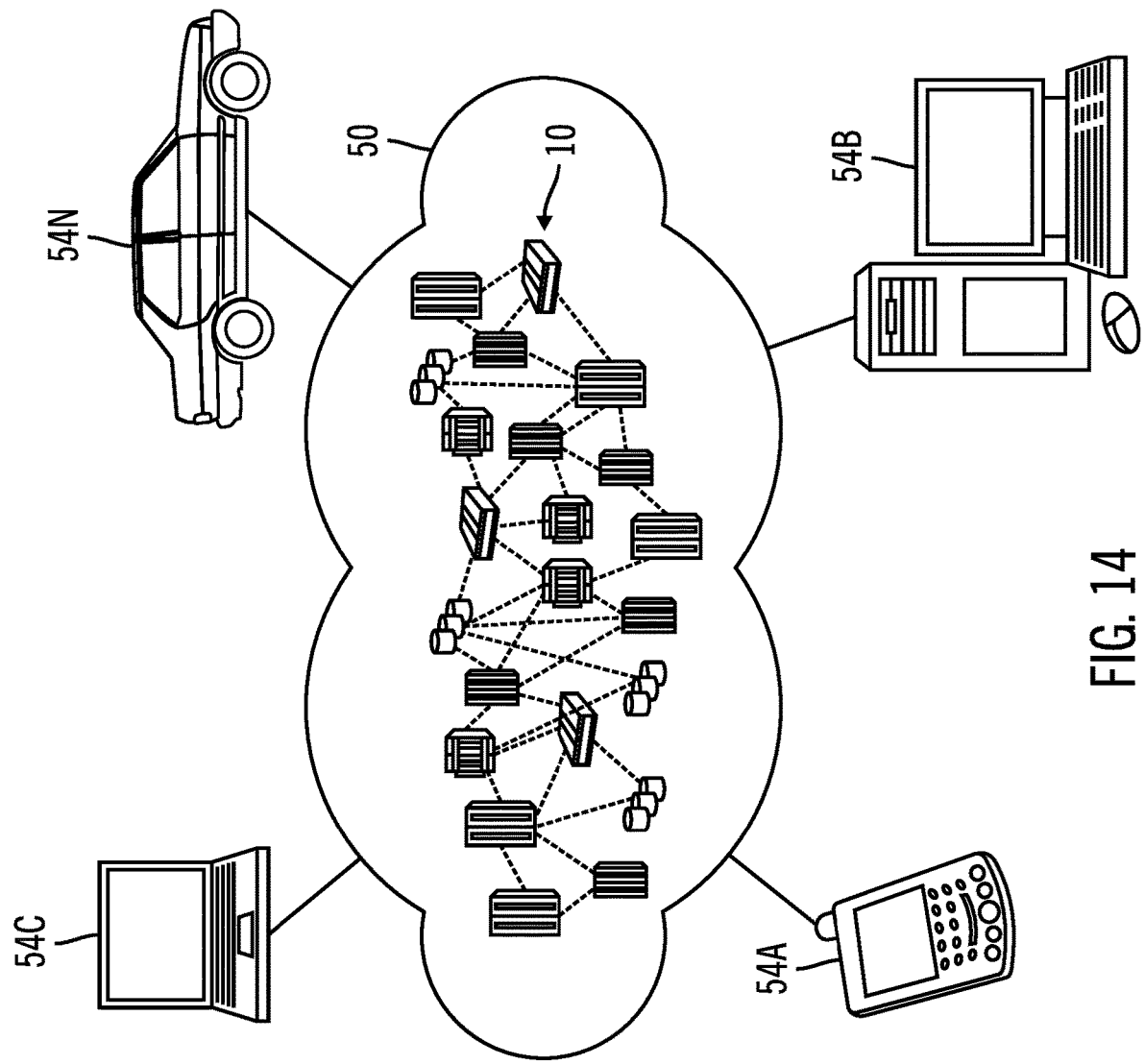
FIG. 14 illustrates a block diagram of a cloud computing environment, in accordance with certain embodiments.

Referring now to FIG. 14 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer 54B, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 14 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 15:
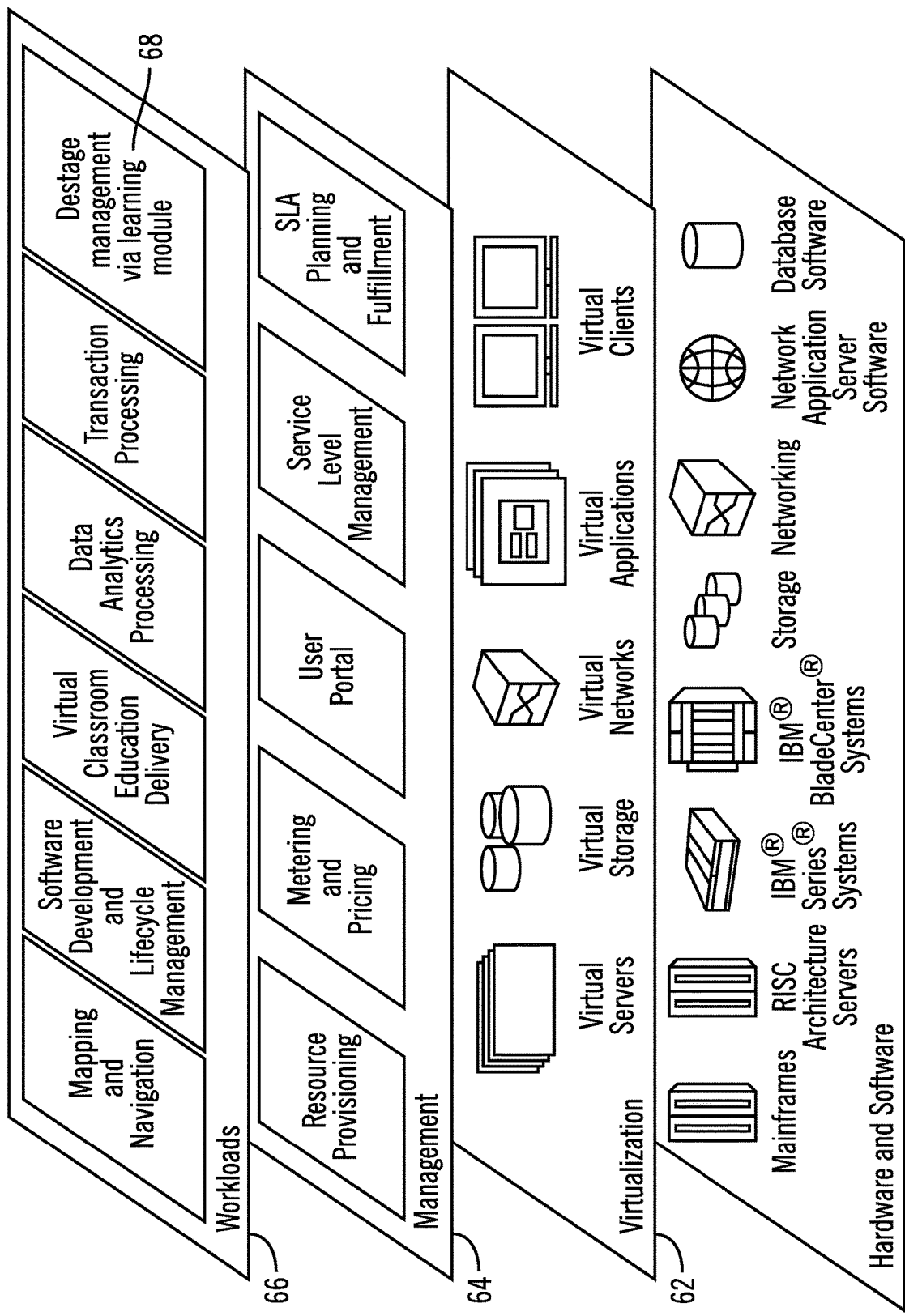
FIG. 15 illustrates a block diagram of further details of the cloud computing environment of FIG. 14, in accordance with certain embodiments.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and destage management via learning module 68 as shown in FIGS. 1-15.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 16:
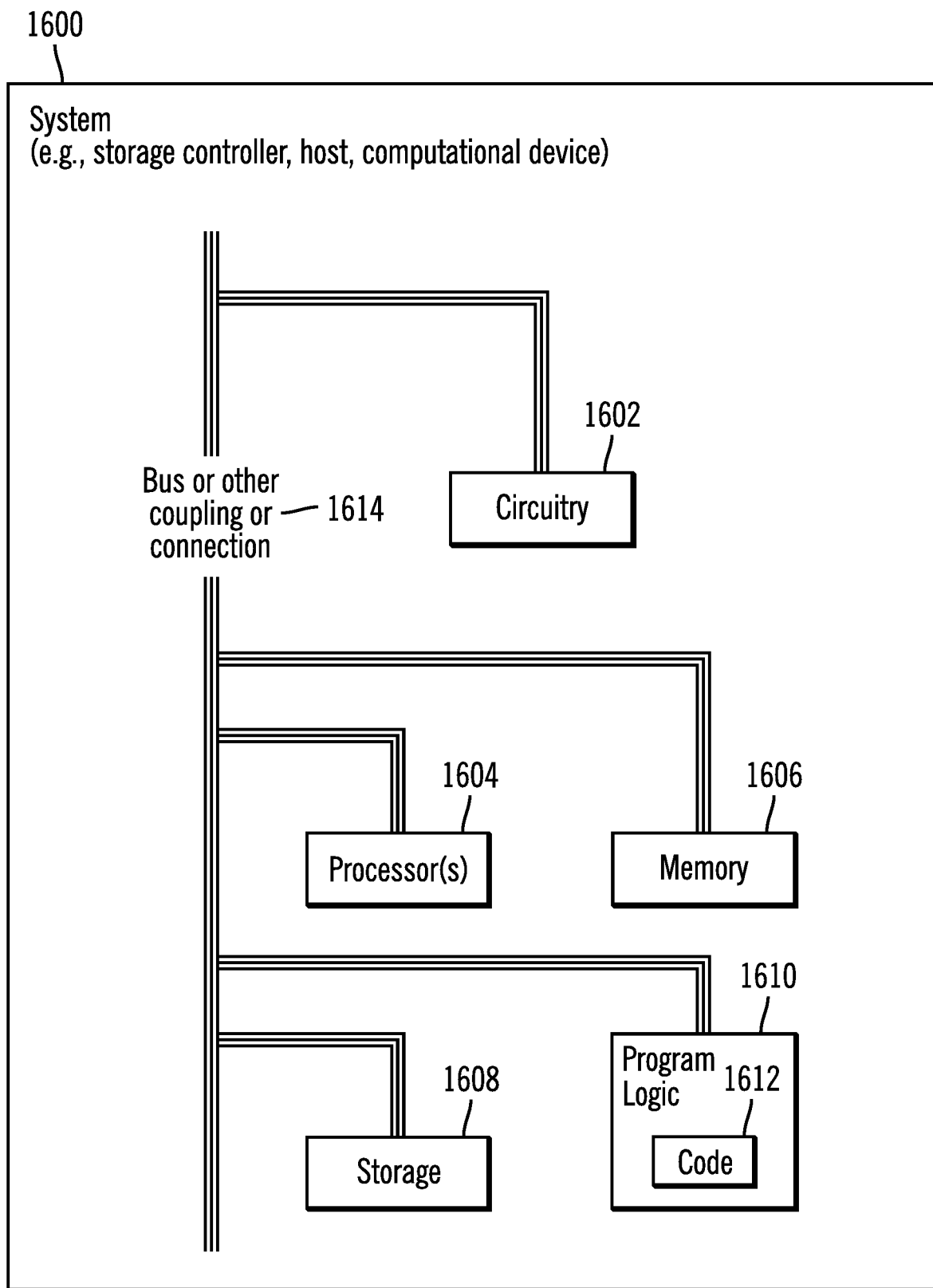
FIG. 16 illustrates a block diagram of a computational system that shows certain elements that may be included in the storage controller or the host, as described in FIGS. 1-15, in accordance with certain embodiments.

FIG. 16 illustrates a block diagram that shows certain elements that may be included in the storage controller 102 or the host 108, or other computational devices in accordance with certain embodiments. The system 1600 may include a circuitry 1602 that may in certain embodiments include at least a processor 1604. The system 1600 may also include a memory 1606 (e.g., a volatile memory device), and storage 1608. The storage 1608 may include a non-volatile memory device (e.g., EEPROM, ROM, PROM, flash, firmware, programmable logic, etc.), magnetic disk drive, optical disk drive, tape drive, etc. The storage 1608 may comprise an internal storage device, an attached storage device and/or a network accessible storage device. The system 1600 may include a program logic 1610 including code 1612 that may be loaded into the memory 1606 and executed by the processor 1604 or circuitry 1602. In certain embodiments, the program logic 1610 including code 1612 may be stored in the storage 1608. In certain other embodiments, the program logic 1610 may be implemented in the circuitry 1602. One or more of the components in the system 1600 may communicate via a bus or via other coupling or connection 1614. Therefore, while FIG. 16 shows the program logic 1610 separately from the other elements, the program logic 1610 may be implemented in the memory 1606 and/or the circuitry 1602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, zSeries, pSeries, xSeries, BladeCenter, WebSphere, and DB2 are trademarks of International Business Machines Corporation registered in many jurisdictions worldwide.

What is claimed is:

1. A method, comprising:
configuring a storage controller to perform a full stride destage, a strip destage, and an individual track destage;
receiving, by a machine learning module, a plurality of inputs corresponding to a plurality of factors that affect performance of data transfer operations and preservation of drive life in the storage controller;
in response to receiving the inputs, generating, by the machine learning module, a first output, a second output, and a third output that indicate a preference measure for the full stride destage, the strip destage, and the individual track destage respectively; and
determining which type of destage to perform based on the first output, the second output, and the third output, and performing the determined type of destage, the method further comprising determining a margin of error to adjust weights in the machine learning module, wherein determining of the margin of error includes comparing a maximum bandwidth to a current bandwidth, and in response to determining that the current bandwidth is greater than the maximum bandwidth, setting a first expected output corresponding to the first output and a second expected output corresponding to the second output to a first value, and setting a third expected output corresponding to the third output to a second value that is greater than the first value.

2. The method of claim 1, wherein the plurality of factors includes input/output (I/O) operations and bandwidth on a rank, non-volatile storage (NVS) capacity, parity lock contention, holes, unmodified data in a stride.

3. The method of claim 2, wherein the plurality of factors also includes a wear level of a drive, writes per day classification of the drive, and an amount of modified data in the stride.

4. The method of claim 1, wherein computing of the margin of error to adjust weights in the machine learning module includes comparing a maximum I/O operations per second (IOPS) to a current IOPS.

5. The method of claim 4, wherein computing the margin of error to adjust the weights in the machine learning module further includes weighting adjustments to train the machine learning module based on a first weightage provided for the performance of data transfer operations and a second weightage provided for the preservation of drive life.

6. The method of claim 1, wherein the machine learning module is a neural network with one or more hidden layers, and wherein forward and backward propagation mechanisms are utilized to adjust weights in the neural network.

7. The method of claim 1, wherein in response to determining that the current bandwidth is less than or equal to the maximum bandwidth, setting the first output to a difference of the maximum bandwidth and the current bandwidth divided by the maximum bandwidth, setting the second output to a difference between the maximum bandwidth and the current bandwidth divided by a multiple of the maximum bandwidth, and setting the third output to a difference between 1 and a difference of the maximum bandwidth and the current bandwidth divided by the maximum bandwidth.

8. A system, comprising:
a memory; and
a processor coupled to the memory, wherein the processor performs operations, the operations performed by the processor comprising:
configuring the system to perform a full stride destage, a strip destage, and an individual track destage;
receiving, by a machine learning module, a plurality of inputs corresponding to a plurality of factors that affect performance of data transfer operations and preservation of drive life in the system;
in response to receiving the inputs, generating, by the machine learning module, a first output, a second output, and a third output that indicate a preference measure for the full stride destage, the strip destage, and the individual track destage respectively; and
determining which type of destage to perform based on the first output, the second output, and the third output, and performing the determined type of destage, the operations further comprising determining a margin of error to adjust weights in the machine learning module, wherein determining of the margin of error includes comparing a maximum bandwidth to a current bandwidth, and in response to determining that the current bandwidth is greater than the maximum bandwidth, setting a first expected output corresponding to the first output and a second expected output corresponding to the second output to a first value, and setting a third expected output corresponding to the third output to a second value that is greater than the first value.

9. The system of claim 8, wherein the plurality of factors includes input/output (I/O) operations and bandwidth on a rank, non-volatile storage (NVS) capacity, parity lock contention, holes, unmodified data in a stride.

10. The system of claim 9, wherein the plurality of factors also includes a wear level of a drive, writes per day classification of the drive, and an amount of modified data in the stride.

11. The system of claim 8, wherein computing of the margin of error to adjust weights in the machine learning module includes comparing a maximum I/O operations per second (IOPS) to a current IOPS.

12. The system of claim 11, wherein computing the margin of error to adjust the weights in the machine learning module further includes weighting adjustments to train the machine learning module based on a first weightage provided for the performance of data transfer operations and a second weightage provided for the preservation of drive life.

13. The system of claim 8, wherein the machine learning module is a neural network with one or more hidden layers, and wherein forward and backward propagation mechanisms are utilized to adjust weights in the neural network.

14. The system of claim 8, wherein in response to determining that the current bandwidth is less than or equal to the maximum bandwidth, setting the first output to a difference of the maximum bandwidth and the current bandwidth divided by the maximum bandwidth, setting the second output to a difference between the maximum bandwidth and the current bandwidth divided by a multiple of the maximum bandwidth, and setting the third output to a difference between 1 and a difference of the maximum bandwidth and the current bandwidth divided by the maximum bandwidth.

15. A computer program product, the computer program product comprising a computer readable storage medium having computer readable program code embodied therewith, the computer readable program code configured to perform operations, the operations comprising:
configuring a storage controller to perform a full stride destage, a strip destage, and an individual track destage;
receiving, by a machine learning module, a plurality of inputs corresponding to a plurality of factors that affect performance of data transfer operations and preservation of drive life in the storage controller;
in response to receiving the inputs, generating, by the machine learning module, a first output, a second output, and a third output that indicate a preference measure for the full stride destage, the strip destage, and the individual track destage respectively; and
determining which type of destage to perform based on the first output, the second output, and the third output, and performing the determined type of destage, the operations further comprising determining a margin of error to adjust weights in the machine learning module, wherein determining of the margin of error includes comparing a maximum bandwidth to a current bandwidth, and in response to determining that the current bandwidth is greater than the maximum bandwidth, setting a first expected output corresponding to the first output and a second expected output corresponding to the second output to a first value, and setting a third expected output corresponding to the third output to a second value that is greater than the first value.

16. The computer program product of claim 15, wherein the plurality of factors includes input/output (I/O) operations and bandwidth on a rank, non-volatile storage (NVS) capacity, parity lock contention, holes, unmodified data in a stride.

17. The computer program product of claim 16, wherein the plurality of factors also includes a wear level of a drive, writes per day classification of the drive, and an amount of modified data in the stride.

18. The computer program product of claim 15, wherein computing of the margin of error to adjust weights in the machine learning module includes comparing a maximum I/O operations per second (IOPS) to a current IOPS.

19. The computer program product of claim 18, wherein computing the margin of error to adjust the weights in the machine learning module further includes weighting adjustments to train the machine learning module based on a first weightage provided for the performance of data transfer operations and a second weightage provided for the preservation of drive life.

20. The computer program product of claim 15, wherein in response to determining that the current bandwidth is less than or equal to the maximum bandwidth, setting the first output to a difference of the maximum bandwidth and the current bandwidth divided by the maximum bandwidth, setting the second output to a difference between the maximum bandwidth and the current bandwidth divided by a multiple of the maximum bandwidth, and setting the third output to a difference between 1 and a difference of the maximum bandwidth and the current bandwidth divided by the maximum bandwidth.

* * * * *